United States Patent
Thomczyk et al.

(10) Patent No.: US 9,908,707 B2
(45) Date of Patent: Mar. 6, 2018

(54) CONVEYING INSTALLATION WITH IMPROVED DRUM COVER FOR THE DRIVING DRUM, REVERSING DRUM OR LOADBEARING DRUMS

(71) Applicant: ContiTech Transportbandsysteme GmbH, Hannover (DE)

(72) Inventors: Andrea Thomczyk, Goettingen (DE); Frank Kantorek, Lehrte (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 14/533,396

(22) Filed: Nov. 5, 2014

(65) Prior Publication Data
US 2015/0053534 A1 Feb. 26, 2015

Related U.S. Application Data

(63) Continuation of application No. PCT/EP2013/059091, filed on May 2, 2013.

(30) Foreign Application Priority Data

May 7, 2012 (DE) .................. 10 2012 103 966

(51) Int. Cl.
| | | |
|---|---|---|
| B65G 39/10 | (2006.01) | |
| B65G 15/08 | (2006.01) | |
| B65G 39/06 | (2006.01) | |
| B65G 39/02 | (2006.01) | |
| B65G 39/12 | (2006.01) | |

(52) U.S. Cl.
CPC ............. *B65G 15/08* (2013.01); *B65G 39/02* (2013.01); *B65G 39/06* (2013.01); *B65G 39/12* (2013.01)

(58) Field of Classification Search
CPC ....................................................... B65G 39/02
USPC ......................................................... 198/824
See application file for complete search history.

(56) References Cited

U.S. PATENT DOCUMENTS

| | | | | |
|---|---|---|---|---|
| 2,815,515 A | * | 12/1957 | McKinley | A47C 27/144 428/101 |
| 3,711,912 A | * | 1/1973 | Teske | B29D 99/0035 198/835 |
| 3,978,181 A | * | 8/1976 | Vahle | B29C 33/0044 264/275 |

(Continued)

FOREIGN PATENT DOCUMENTS

| | | |
|---|---|---|
| CL | 199501690 | 2/1996 |
| CL | 200001555 | 2/2002 |

(Continued)

OTHER PUBLICATIONS

International Search Report dated Jul. 11, 2013 of international application PCT/EP2013/059091 on which this application is based.

*Primary Examiner* — William R Harp
(74) *Attorney, Agent, or Firm* — Walter Ottesen, P.A.

(57) ABSTRACT

A conveying installation has a conveying belt and also has drums, loadbearing rollers and loadbearing frameworks. The conveying installation forms a material-conveying upper strand with a supply location for the conveying material and a mostly material-free lower strand. At least one drum and/or at least one loadbearing roller have/has a drum cover, which contains at least one layer composed of a foamed polymer mix.

5 Claims, 2 Drawing Sheets

(56) References Cited

U.S. PATENT DOCUMENTS

| | | | | |
|---|---|---|---|---|
| 4,029,200 | A | * | 6/1977 | Dillon .................... B65G 39/09 |
| | | | | 193/37 |
| 5,381,887 | A | | 1/1995 | Emmons |
| 5,468,531 | A | * | 11/1995 | Kikukawa .......... G03G 15/2057 |
| | | | | 428/304.4 |
| 5,725,209 | A | * | 3/1998 | Takahashi ............ B65H 3/5261 |
| | | | | 271/109 |
| 7,249,442 | B2 | | 7/2007 | Pellegrino et al. |
| 4,837,064 | A1 | | 11/2010 | Robinson |
| 8,453,831 | B1 | * | 6/2013 | Thimmel ................ B65G 39/02 |
| | | | | 198/842 |
| 9,187,251 | B2 | | 11/2015 | Thomczyk et al. |
| 9,193,527 | B2 | * | 11/2015 | Thomczyk ........... B65G 11/166 |
| 9,394,131 | B2 | * | 7/2016 | Imazeki ................. B65H 27/00 |

FOREIGN PATENT DOCUMENTS

| | | |
|---|---|---|
| DE | 841 562 C | 6/1952 |
| DE | 1 781 214 A1 | 3/1971 |
| DE | 28 54 583 A1 | 6/1980 |
| DE | 35 30 034 A1 | 2/1987 |
| DE | 267 474 A1 | 5/1989 |
| DE | 290 165 A5 | 5/1991 |
| DE | 290 166 A5 | 5/1991 |
| DE | 200 21 355 U1 | 3/2000 |
| DE | 200 18 661 U1 | 12/2000 |
| FR | 2113824 A1 | 6/1972 |

* cited by examiner

CONVEYING INSTALLATION WITH IMPROVED DRUM COVER FOR THE DRIVING DRUM, REVERSING DRUM OR LOADBEARING DRUMS

CROSS REFERENCE TO RELATED APPLICATIONS

This application is a continuation application of international patent application PCT/EP2013/059091, filed May 2, 2013, designating the United States and claiming priority from German application 10 2012 103 966.6, filed May 7, 2012, and the entire content of both applications is incorporated herein by reference.

FIELD OF THE INVENTION

The invention relates to a conveyor installation with at least one drive drum and/or direction-reversal drum with a drum covering, and moreover with at least one conveyor belt and loadbearing rollers, and with support frames where the conveyor installation forms a material-conveying upper web with an application site for the material to be conveyed, and forms a mostly material-free lower web. There are, however, also conveyor installations which are also loaded within the lower web.

BACKGROUND OF THE INVENTION

Drive drums, direction-reversal drums, deflector drums, and drum coverings for these are disclosed by way of example in DE 1 781 214, DD 290 166 A5, DD 290 165 A5, or DD 267 474 A1.

The drum coverings for the drive drum and/or directional-reversal drum and/or deflector drums, these being important components of a conveyor installation, are mostly composed as described by way of example in DD 267 474 A1 of a rubber mixture comprising at least one rubber component or one rubber-component blend, at least one crosslinking agent or one crosslinking system, comprising a crosslinking agent and an accelerator, and also mostly other mixture ingredients, in particular at least one filler and/or at least one processing aid and/or at least one antioxidant and/or at least one plasticizer and/or other additional substances (for example, fibers, color pigments). The vulcanization of the rubber mixture gives the drum coverings appropriate resilient properties.

The drum coverings are usually adhesive-bonded at low temperatures on the individual drums (drive drum, direction-reversal drum, deflector drum, loadbearing rollers, et cetera), and serve to improve force transmission to the conveyor belt, since the rubberization mostly applied on the drum, termed drum covering, reduces slip between rubber and metal. Direct contact is thus achieved between the drum covering made of rubber and a mostly rubberized outer sheet of the conveyor belt. By way of example, the force exerted at the circumference of the drive drum has to be sufficiently high to be capable of achieving frictional drive of the pretensioned loaded conveyor belt. The covering of the drums in belt-conveyor installations therefore has a decisive effect on the maximal transferable torque, and on the lifetime of the belt.

The implication of the abovementioned "slip" is that optimal running of the conveyor belt is prevented, or that, because material to be conveyed penetrates between the drum surface and the conveyor belt, the drum and the conveyor belt can be damaged.

SUMMARY OF THE INVENTION

In the context of a further development, the object of the invention is to provide a conveyor installation which features a reduction of damage to the drive drum and/or the direction-reversal drum and/or the deflector drum and/or the loadbearing rollers and/or the conveyor belt. A particular result of this is an increased lifetime of the individual drums and/or of the conveyor belt.

The object is achieved in that the drum covering of the drive drum and/or direction-reversal drum and/or support drums and/or deflector drum comprises at least one layer that is composed of a foamed polymer mixture.

Surprisingly, it has been found that a layer of this type made of a foamed polymer mixture has a favorable effect on the reduction of damage due to material to be conveyed that penetrates between the drum surface and the conveyor belt. The foamed layer improves the frictional contact between drum surface and conveyor belt, particularly when the location of the foamed layer is directly on the surface of the drum covering. In this case it is actually possible to omit the type of additional surface profiling described by way of example in DE 28 54 583 A1, DE 200 18 661 U1, DE 841562 or DE 200 21 355 U1.

At the same time, the presence of at least one foamed additional layer provides a weight reduction that has a favorable effect on costs and on energy consumption.

The expressions polymer mixture and rubber mixture are used synonymously.

The invention is in principle suitable for all conveyor installations and all types of drums or rollers used in a conveyor installation.

Particular mention may be made here of correction rollers, hold-down rollers in tubular conveyor belt installations, loadbearing rollers, support rollers, and direction-reversal rollers.

The structure of the drum covering here can be analogous to that of a conveyor belt, with possible omission of any textile inserts and/or of the outer sheets.

In one particularly preferred embodiment, the drum covering preferably comprises at least one outer sheet at the surface of the drum covering.

The outer sheet here can take the form of foil, or can be a woven fabric, or can be composed of at least one polymeric material.

If the outer sheet is respectively composed of at least one polymeric material, it is preferable that this is a rubber selected from the group consisting of natural rubber (NR) and/or butadiene rubber (BR) and/or chloroprene rubber (CR) and/or styrene-butadiene rubber (SBR) and/or nitrile rubber (NBR) and/or butyl rubber (IIR) and/or ethylene-propylene rubber (EPM) and/or ethylene-propylene-diene rubber (EPDM) and/or polyacrylate rubber (ACM) and/or epichlorohydrin rubber (ECO) and/or chlorosulfonated polyethylene rubber (CSM) and/or silicone rubber (MVQ) and/or fluoro rubber (FPM).

The rubbers mentioned can be used here alone or in a blend. If the outer sheet on the loadbearing side and/or on the drive side is a foil or a woven fabric, it is likewise possible here to use the materials mentioned. It is particularly preferable that the foil is based on at least one fluoro polymer. This ensures additional optimized solvent resistance.

The outer sheet can moreover comprise, alongside the rubber component, at least one crosslinking agent or one crosslinking system, comprising a crosslinking agent and an accelerator, and mostly other mixture ingredients, in particular at least one filler and/or at least one processing aid and/or at least one antioxidant and/or at least one plasticizer and/or other additional substances (for example, fibers, color pigments).

If the drum covering comprises at least one textile insert, that is, a single or multiple-ply textile product, in particular in the form of a woven fabric, this is preferably composed of cotton and/or polyamide and/or polyester and/or aramid and/or glass and/or basalt and/or steel. The materials mentioned can be used alone or in the form of hybrid inserts which are composed of at least one of the materials mentioned. A woven polyamide-polyester fabric is of particular importance here.

In a preferred embodiment, the drum covering comprises at least one layer made of at least one polymeric material, the layer being composed of a foamed polymer mixture. The qualitative and/or quantitative composition of the foamed polymer mixture here, with the exception of the required blowing agents, can be the same as or different from the composition of an outer layer that is present comprising a polymeric material. In one particularly preferred embodiment, the qualitative and/or quantitative, in particular the qualitative, composition, with the exception of the blowing agents required, is the same as the composition of the rubber mixture of the outer layer. Complexity in the production process is thus not increased, and other advantages are achieved in respect of time and costs. It is likewise possible that the outer sheet of the drum covering is composed of the foamed polymer layer.

The rubber for the foamed polymer layer is selected from the group consisting of natural rubber (NR) and/or butadiene rubber (BR) and/or chloroprene rubber (CR) and/or styrene-butadiene rubber (SBR) and/or nitrile rubber (NBR) and/or butyl rubber (IIR) and/or ethylene-propylene rubber (EPM) and/or ethylene-propylene-diene rubber (EPDM) and/or polyacrylate rubber (ACM) and/or polyurethane (PU) and/or epichlorohydrin rubber (ECO) and/or chlorosulfonated polyethylene rubber (CSM) and/or silicone rubber (MVQ) and/or fluoro rubber (FPM).

The rubbers mentioned can be used here alone or in a blend. The foamed polymer layer can moreover comprise the conventional quantities of at least one filler. Any of the fillers known to the person skilled in the art can be used here, examples being silica, carbon black, mica, carbon nanotubes, silicates, aluminum hydroxide, talc, chalk, et cetera.

It is likewise possible to use any of the other additional substances known to the person skilled in the art, for example pigments, plasticizers, antiozonants, and antioxidants. The vulcanization of the foamed layer is generally achieved peroxidically, for example, when EPDM is used as rubber component, or else by sulfur vulcanization when NR, BR, or SBR is used, or else by use of bisphenols when by way of example FPM is used.

The foamed polymer layer also comprises at least one blowing agent. The expression blowing agent usually means pore-forming blowing gases such as azo and diazo compounds, which on exposure to heat or catalysts liberate gases (for example, $N_2$ or $CO_2$) and thus serve for the production of foamed polymer mixtures. The blowing agents here decompose at a particular temperature during processing, with formation of gas, or when volatile solvents are added during polymerization or vulcanization. The foaming then takes place either on discharge from the extrusion die, that is, via vulcanization in a UHF (microwave) hot-air system or injection molding, or in open molds.

It has been found preferable to use blowing agents, in particular blowing agents based on at least one acrylonitrile polymer, such as EXPANCEL®.

It is moreover also possible to add foam stabilizers if desired.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
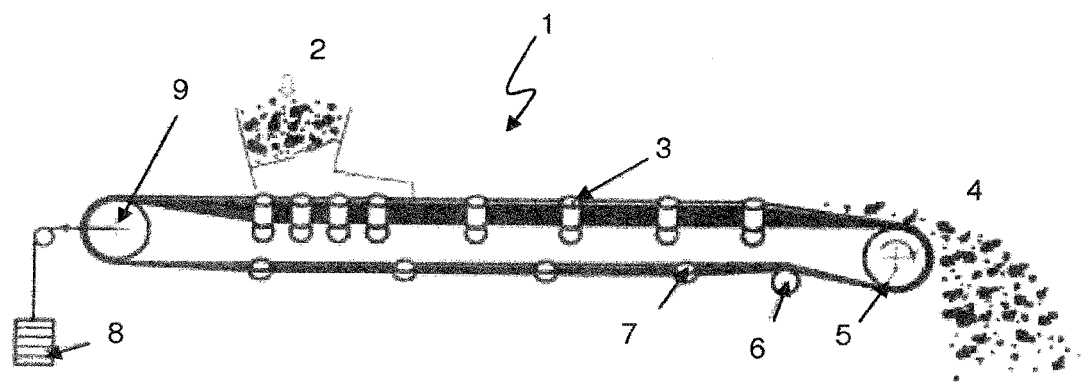
FIG. 1 shows a conveyor installation with a conveyor belt, a drum, and loadbearing rollers.

FIG. 1 shows a conveyor installation 1 in the form of a belt-conveyor installation with a conveyor belt with application site 2 for material to be conveyed and discharge site 4 for material to be conveyed. The conveyor installation moreover comprises upper-web loadbearing rollers 3, lower-web loadbearing rollers 7, a deflector drum 6, a direction-reversal drum 9, a tensioning device 8, and a drive drum 5. The drive drum 5 and/or direction-reversal drum 9 and/or loadbearing rollers (3, 7) and/or the deflector drum 6 here comprise at least one layer based on a foamed polymer mixture.

Figure 2:
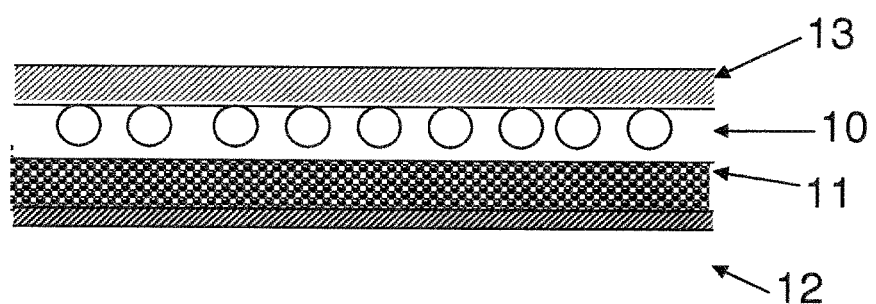
FIG. 2 shows a cross section through a drum covering with a foamed polymer layer between covering underside and outer sheet; and, FIG. 3 shows a cross section through a drum covering with a foamed polymer layer as outer sheet.

FIG. 2 shows a cross section through a drum covering with a foamed layer 10 located between covering underside 12 and outer sheet 13 of the drum covering; there is also an embedded textile layer 11 present here, and the additional foamed layer 10 is in direct contact with the textile layer 11 and the outer sheet 13. The outer sheet 13 here can take the form of foil of rubber mixture. The underside 12 of the drum covering here can be based on a rubber mixture or can be composed of at least one metal.

Figure 3:
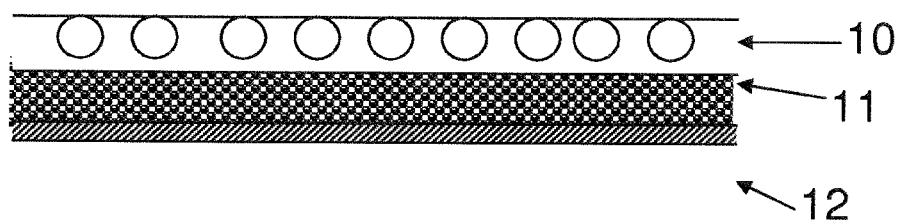

FIG. 3 shows a cross section through a drum covering with a foamed layer 10 which takes the form of outer sheet of a drum covering. Between covering underside 12 and the foamed layer 10 there is a textile layer 11.

It is understood that the foregoing description is that of the preferred embodiments of the invention and that various changes and modifications may be made thereto without departing from the spirit and scope of the invention as defined in the appended claims.

KEY (Part of the Description)
1 Conveyor installation
2 Application site for material to be conveyed
3 Upper-web loadbearing rollers
4 Discharge site for material to be conveyed
5 Drive drum
6 Deflector drum
7 Lower-web loadbearing rollers
8 Tensioning device
9 Direction-reversal drum
10 Foamed polymer layer
11 Textile layer
12 Underside of drum covering
13 Outer layer (outer sheet)

What is claimed is:

1. A conveyor installation comprising:
a conveyor belt,
a plurality of drums;
at least one loadbearing roller; and,
a support frame;
wherein the conveyor installation forms a material-conveying upper web with an application site for the material to be conveyed, and forms a lower web;
wherein at least one drum and/or the at least one loadbearing roller has a drum covering which comprises at least one layer composed of a foamed polymer mixture;
wherein the foamed polymer mixture is selected from the group consisting of butyl rubber (IIR), ethylene-propylene rubber (EPM), ethylene-propylene-diene rubber (EPDM), polyacrylate rubber (ACM), epichlorohydrin rubber (ECO), chlorosulfonated polyethylene rubber (CSM), silicone rubber (MVQ), and fluoro rubber (FPM), or a mixture thereof; and
wherein an outer sheet of the drum covering is composed of the foamed polymer mixture.

2. The conveyor installation as claimed in claim 1, wherein the foamed polymer mixture is selected from the group consisting of EPDM, ACM, ECO, CSM, MVQ, and FPM or a mixture thereof.

3. The conveyor installation as claimed in claim 1, wherein the foamed polymer further comprises at least one pore-forming blowing agent that is an azo or diazo compound gas.

4. The conveyor installation as claimed in claim 3, wherein the pore-forming blowing agent comprises at least one acrylonitrile polymer.

5. The conveyor installation as claimed in claim 1, wherein the outer sheet is in the form of foil, woven fabric, and/or comprises at least one polymeric material.

* * * * *

UNITED STATES PATENT AND TRADEMARK OFFICE
CERTIFICATE OF CORRECTION

PATENT NO. : 9,908,707 B2  
APPLICATION NO. : 14/533396  
DATED : March 6, 2018  
INVENTOR(S) : A. Thomczyk et al.

Page 1 of 1

It is certified that error appears in the above-identified patent and that said Letters Patent is hereby corrected as shown below:

<u>On Page 2</u>:

Under (56) Foreign Patent Documents: delete "DE 267 474 A1" and insert --DD 267 474 A1-- therefor.

Under (56) Foreign Patent Documents: delete "DE 290 165 A1" and insert --DD 290 165 A1-- therefor.

Under (56) Foreign Patent Documents: delete "DE 290 166 A1" and insert --DD 290 166 A1-- therefor.

Signed and Sealed this  
Thirty-first Day of July, 2018

Andrei Iancu  
*Director of the United States Patent and Trademark Office*